United States Patent [19]
Fujie

[11] Patent Number: 4,690,517
[45] Date of Patent: Sep. 1, 1987

[54] RETROFOCUS TYPE WIDE ANGLE LENS

[75] Inventor: Daijiro Fujie, Sagamihara, Japan

[73] Assignee: Nippon Kogaku K. K., Tokyo, Japan

[21] Appl. No.: 783,523

[22] Filed: Oct. 3, 1985

[30] Foreign Application Priority Data

Oct. 9, 1984 [JP]  Japan ................. 59-212243

[51] Int. Cl.⁴ .................. G02B 9/64; G02B 13/04
[52] U.S. Cl. ................................................ 350/458
[58] Field of Search ................................. 350/458

[56] References Cited

U.S. PATENT DOCUMENTS 4,348,085  9/1982  Mogami ........................ 350/458

FOREIGN PATENT DOCUMENTS 39875  12/1970  Japan .
1238668  7/1971  United Kingdom .

Primary Examiner—John K. Corbin
Assistant Examiner—Rebecca D. Gass
Attorney, Agent, or Firm—Shapiro and Shapiro

[57] ABSTRACT

A retrofocus type wide angle lens has, in succession from the object side, a first component which is a positive meniscus lens having its convex surface facing the object side, a second component which is a negative meniscus lens having its convex surface facing the object side, a third component which is a negative meniscus lens having its convex surface facing the object side, a fourth component having a cemented surface of negative refractive power convex toward the object surface and having a negative refractive power as a whole, a fifth component which is a biconvex positive lens having a surface of sharper curvature on the object side, a sixth component which is a positive meniscus lens having its convex surface facing the image side, a stop, a seventh component which is a biconcave cemented negative lens comprising a positive meniscus lens having its convex surface facing the image side and a biconcave negative lens cemented thereto, an eighth component which is a positive meniscus lens having its convex surface facing the image side, and a ninth component which is a biconvex positive lens. The retrofocus type wide angle lens satisfies specified conditions.

13 Claims, 3 Drawing Figures

RETROFOCUS TYPE WIDE ANGLE LENS

BACKGROUND OF THE INVENTION

1. Field of the Invention

This invention relates to a compact retrofocus type wide angle lens.

2. Description of the Prior Art

As wide angle lenses for single lens reflex cameras, use is generally made of the so-called retrofocus type lenses which can provide a back focal length long as compared with the focal length. However, the construction of the retrofocus type lens is asymmetrical with respect to the stop and therefore, aberration correction is difficult and the degree thereof becomes stronger as the angle of view becomes greater. To meet the requirement of interchangeable lenses for compactness and greater aperture ratio as the recent tendency, aberration correction tends to be more difficult. That is, if the refractive power of the divergent group disposed adjacent to the object side is strengthened for the purpose of compactness, various aberrations such as spherical aberration and coma created in each lens are aggravated, and this tendency becomes stronger with an increase in aperture. In a wide angle lens having an angle of view of 94°, a construction in which the number of negative lenses constituting the divergent group is increased is known, for example, from British Patent No. 1,238,668 or U.S. Pat. No. 4,348,085, but this construction has suffered from a disadvantage that the full length of the lens system increases and the forward lens system becomes bulky. In addition, it has involved many difficulties under the influence of high-order aberrations to correct chromatic difference of magnification well over a wide angle of view, and many of the known lenses of this type have been insufficient because of the deterioration of the marginal image relative to the center of the picture plane or the blur of colors.

SUMMARY OF THE INVENTION

It is an object of the present invention to provide a compact retrofocus type wide angle lens having a back focal length 1.85 times or more as long as the focal length of the entire system and yet having an angle of view of the order of 95° and an aperture ratio of 1:2.8 and keeping good balance between various aberrations.

The present invention has found out optimum conditions for aberration correction in a unique constructions wherein, for the contrary requirements of compactness and a great aperture, an appropriate refractive power is provided to the divergent group and as the components thereof, a cemented negative lens having a relatively great center thickness and having its convex surface facing the object side and having a cemented surface of negative refractive power and having a long focal length is disposed and a positive lens of strong refractive power is disposed on the object side of a stop and a cemented negative lens having a great center thickness is disposed on the image side of the stop.

DESCRIPTION OF THE PREFERRED EMBODIMENTS

Figure 1:
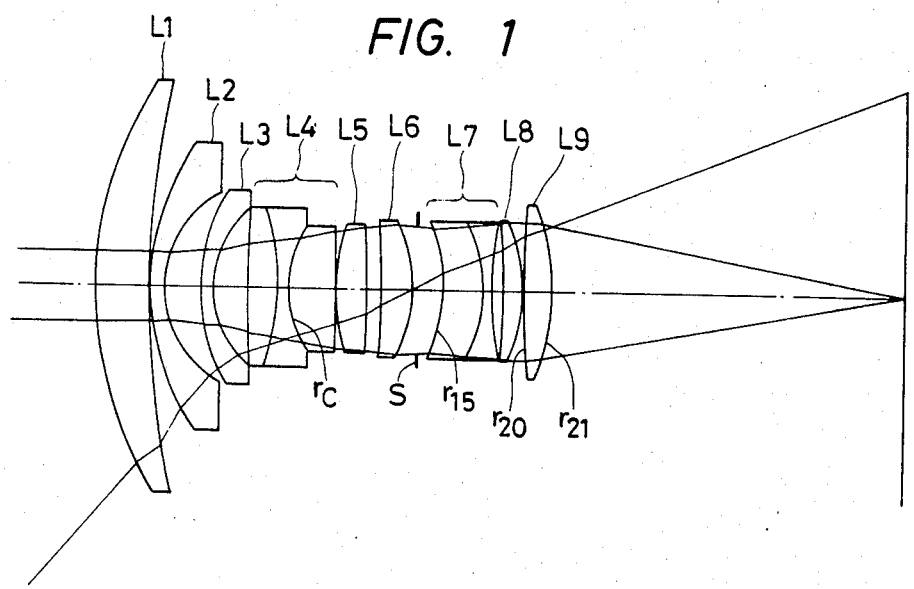
FIG. 1 shows the lens construction of first to fourth embodiments of the present invention.

The retrofocus type wide angle lens of the present invention, as shown, for example, in FIG. 1 which shows the construction of a lens according to an embodiment of the present invention, has, in succession from the object side, a first component L1 which is a positive meniscus lens having its convex surface facing the object side, a second component L2 which is a negative meniscus lens having its convex surface facing the object side, a third component L3 which is a negative meniscus lens having its convex surface facing the object side, a fourth component L4 convex toward the object side and having a cemented surface of negative refractive power and having a negative refractive power as a whole, a fifth component L5 which is a cemented or single biconvex positive lens having a surface of sharper curvature on the object side, a sixth component L6 which is a positive meniscus lens having its convex surface facing the image side, a stop S, a seventh component L7 which is a biconcave cemented negative lens comprising a positive meniscus lens having its convex surface facing the image side and a biconcave negative lens cemented thereto, an eighth component L8 which is a positive meniscus lens having its convex surface facing the image side, and a ninth component L9 which is a biconvex positive lens, and satisfies the following conditions:

(1) $-0.9f < f_{14} < -0.6f$
(2) $0.35f < D_4 < 0.53f$
(3) $-1.3f < r15 < -0.9f$
(4) $-0.9 < (r21+r20)/(r21-r20) < 0.2$
(5) $23 < \nu_2 < 40$ where f is the combined focal length of the entire system, $f_{14}$ is the combined focal length of the first component L1 to the fourth component L4, $D_4$ is the combined center thickness of the fourth component L4, r15, is the radius of curvature of the object side lens surface of the seventh component L7, r20 and r21 are the radii of curvature of the object side and image side lens surfaces, respectively, of the ninth component L9, and $\nu_2$ is the abbe number of the second component L2.

Formula (1) above prescribes the combined refractive power of the first to fourth components which together constitute a divergent lens group. To maintain good aberration balance while securing a predetermined back focal length, the lens construction of the divergent group and its appropriate refractive power distribution are important. In a divergent group having a strong negative refractive power to secure a long back focal length, coma tends to occur in addition to negative distortion and positive curvature of image field. In the present invention, as described above, the divergent group is comprised of a positive meniscus lens disposed as the first component most adjacent to the object side, and subsequently the second and third components which are two negative meniscus lenses, and the fourth component which is a negative cemented lens of relatively small refractive power, and enables good correction of various aberrations to be accomplished by the refractive power distribution as indicated in formula (1). If the combined focal length of the first to fourth components as the divergent group exceeds the upper limit of formula (1), the back focal length can be made longer while, on the other hand, the refractive power of each surface will become stronger and negative distortion and coma can no longer be well corrected even by the succeeding lens components. On the other hand, if the lower limit of formula (1) is exceeded, the burden of each lens component of the divergent group will be reduced and this is advantageous to aberration correction, but it well becomes difficult to secure a sufficiently long back focal length.

Condition (2) prescribes the combined center thickness of the fourth component L4 as the cemented negative lens positioned most rearwardly in the divergent group, and is particularly for well accomplishing the flattening of the image plane and the correction of distortion. If the upper limit of this condition is exceeded, it will be advantageous to the flattening of the image plane and the correction of distortion, but will result in an increase in the aperture of the forward lens and it will become difficult to achieve the compactness of the lens system. On the other hand, if the lower limit of this condition is exceeded, it will result in the curvature of the sagittal image plane and at the same time, the correction of distortion will become insufficient.

It is important to provide in the fourth component a cemented surface convex toward the object side and having a negative refractive power, and it is desirable to satisfy the following condition:

(6) $0.1f < (n_H - n_L)/r_c < 0.4f$, where $r_c$ is the radius of curvature of this cemented surface, and $n_H$ and $n_L$ are the refractive indices of the lenses on the object side and the image side, respectively, of this cemented surface. If the upper limit of this condition (6) is exceeded, spherical aberration will be over-corrected and coma will be aggravated, and if the lower limit of this condition is exceeded, the necessity of strengthening the refractive powers of the second and third components will arise from the relation with condition (1) and therefore, the correction of coma and distortion will tend to become difficult.

Now, considering the convergent group succeeding to the above-described divergent group, the light beam caused to diverge by the divergent group is converged by the fifth and sixth components of strong positive refractive power as the forward components of the convergent group, and enters the seventh component which is a biconcave cemented negative lens disposed immediately rearwardly of the stop. Here, the action of the object side surface r15 of the seventh component which receives the converged light beam from the sixth component is important. That is, the seventh component lies near the stop S and has the function of correcting spherical aberration under-corrected by the sixth component and at the same time, securing the back focal length sufficiently long and assisting the work of the divergent group. If the value of the radius of curvature r15 of this surface departs from the lower limit of condition (3), the burden of negative refractive power will become excessively great on the image side surface of the seventh component and this will result in an increase in coma. On the other hand, if the upper limit of condition (3) is exceeded, spherical aberration will be over-corrected and it will be difficult to realize a light specification of an aperture ratio of 1:2.8. Also, it is effective to increase the combined center of thickness of the seventh component in order to reduce the burden of the both refracting surfaces of the seventh component, but increasing said center thickness excessively would be not preferably in the working of the lens and in addition, would increase the coma in the sagittal direction. Therefore, when the center thickness of the positive meniscus lens and the biconcave negative lens which together constitute the seventh component are d15 and d16, respectively, it is desirable that the sum of them satisfy the following condition:

(7) $0.2f < d15 + d16 < 0.4f$

Condition (4) prescribes the shape of the ninth component as the biconvex positive lens positioned most adjacent to the image side, and is important for well maintaining the balance between the aberrations of the on-axis light beam and the off-axis light beam. That is, if the upper limit of this condition is exceeded, r20 and r21 will become equal to each other and this is disadvantageous to secure the back focal length sufficiently and at the same time, distortion will increase in the negative direction. On the other hand, if the lower limit of this condition is exceeded, the burden of the image side surface of the ninth component will increase and therefore, spherical aberration will be under-corrected.

In addition to the above-described construction, to well correct chromatic aberration, particularly, chromatic difference of magnification, it is necessary to give heed to the following point. In a retrofocus type wide angle lens, the chromatic difference of magnification for g-line ($o = 436$ nm) is generally under-corrected in the intermediate zone of the picture plane and over-corrected in the most marginal zone of the picture plane and has the so-called bending of chromatic difference of magnification, and this tendency becomes more remarkable as the angle of view becomes greater. Ths inventor has found that it is appropriate to form the first component, which is a positive meniscus lens, of low dispersion glass of great Abbe number in order to eliminate this disadvantage, and in addition, use the high dispersion glass as indicated by condition (5) above for the Abbe number of the second component as a negative meniscus lens. That is, the bending of chromatic difference of magnification can be corrected by greatly under-correcting the high-order chromatic difference of magnification created by the first component of positive refractive power, by the second component of negative refractive power which is next to the first component in the incidence height of the oblique light beam. In that case, the low-order chromatic difference of magnification is also under-corrected and therefore, in order to well correct the on-axis aberration and chromatic difference of magnification in the entire system, according to the present invention, at least one of the fourth and fifth components which are low in the incidence height of the oblique light beam is made into a cemented lens. If the upper limit of condition (5) is exceeded, the correction of the bending of chromatic difference of magnification will become insufficient, and if the lower limit of condition (5) is exceeded, chromatic difference of magnification, including the low-order one, will become under-corrected and it will become difficult to keep balance in the entire system.

To correct chromatic difference of magnification better, it is desirable that the cemented surface in the seventh component L7 adjacent to the image side of the stop be made convex toward the image side and the radius of curvature r16 of this cemented surface satisfy the following condition:

(8) $-1.0f < r16 < -0.5f$

If the upper limit of this condition is exceeded, spherical aberration and coma of g-line will become over-corrected, and if the lower limit of this condition is exceeded, it will become difficult to correct the bending of chromatic difference of magnification.

In each of the first to fourth embodiments, as shown in FIG. 1, the fourth component is comprised of a biconvex positive lens, a biconcave negative lens and a positive lens cemented together, the seventh component is comprised of a positive meniscus lens and a biconcave negative lens cemented together, and each of the remaining components is comprised of a single lens.

Tables 1 to 4 below show the numerical data of the first to fourth embodiments, respectively. In each of these tables, the numbers at the left end represent the order from the object side, and the refractive indices and Abbe numbers are for d-line ($\lambda = 587.6$ nm). Bf represents the back focal length.

TABLE 1

(First Embodiment)
Focal length f = 100  F-number 2.8
Angle of view $2\omega$ = 94°

| No. | Radius of curvature r | Center thickness & spacing d | Refractive index n | Abbe number $\nu$ | |
|---|---|---|---|---|---|
| 1 | 194.441 | 27.481 | 1.62041 | 60.4 | $L_1$ |
| 2 | 496.499 | 0.491 | | | |
| 3 | 135.475 | 6.870 | 1.78470 | 26.1 | $L_2$ |
| 4 | 54.154 | 19.629 | | | |
| 5 | 95.250 | 5.889 | 1.71300 | 54.0 | $L_3$ |
| 6 | 50.692 | 18.648 | | | |
| 7 | 375.014 | 15.703 | 1.75520 | 27.6 | |
| 8 | −147.513 | 6.379 | 1.77279 | 49.4 | $L_4$ |
| 9 | 58.690 | 24.536 | 1.62588 | 35.6 | |
| 10 | ∞ | 0.491 | | | |
| 11 | 161.670 | 16.194 | 1.67270 | 32.2 | $L_5$ |
| 12 | −462.413 | 7.852 | | | |
| 13 | −441.788 | 15.703 | 1.58267 | 46.5 | $L_6$ |
| 14 | −80.115 | 16.194 | | | |
| 15 | −112.362 | 22.083 | 1.77279 | 49.4 | |
| 16 | −69.443 | 5.398 | 1.78470 | 26.1 | $L_7$ |
| 17 | 264.223 | 4.034 | | | |
| 18 | −389.780 | 10.796 | 1.62041 | 60.4 | $L_8$ |
| 19 | −85.215 | 0.491 | | | |
| 20 | 472.174 | 13.740 | 1.62041 | 60.4 | $L_9$ |
| 21 | −153.303 | | | | |

Bf = 186.3
$f_{14}$ = −0.737 f

TABLE 2

(Second Embodiment)
Focal Length f = 100  F-number 2.8
Angle of view $2\omega$ = 96°

| No. | Radius of curvature r | Center thickness & spacing d | Refractive index n | Abbe number $\nu$ | |
|---|---|---|---|---|---|
| 1 | 161.771 | 20.589 | 1.59319 | 67.9 | $L_1$ |
| 2 | 435.296 | 0.490 | | | |
| 3 | 131.378 | 4.412 | 1.79504 | 28.6 | $L_2$ |
| 4 | 51.473 | 16.667 | | | |
| 5 | 96.904 | 4.412 | 1.71700 | 48.1 | $L_3$ |
| 6 | 51.255 | 17.158 | | | |
| 7 | 490.216 | 14.216 | 1.74077 | 27.6 | |
| 8 | −117.652 | 7.353 | 1.74810 | 52.3 | $L_4$ |
| 9 | 52.943 | 25.001 | 1.61293 | 37.0 | |
| 10 | −637.281 | 0.980 | | | |
| 11 | 150.986 | 17.648 | 1.64831 | 33.8 | $L_5$ |
| 12 | −833.367 | 6.618 | | | |
| 13 | −562.581 | 17.648 | 1.62041 | 60.3 | $L_6$ |
| 14 | −80.395 | 14.706 | | | |
| 15 | −109.318 | 20.589 | 1.79668 | 45.5 | |
| 16 | −83.337 | 5.392 | 1.78472 | 25.8 | $L_7$ |
| 17 | 229.911 | 4.902 | | | |
| 18 | −455.901 | 11.275 | 1.60311 | 60.7 | $L_8$ |
| 19 | −82.580 | 0.490 | | | |
| 20 | 647.085 | 13.726 | 1.62041 | 60.4 | $L_9$ |
| 21 | −156.504 | | | | |

Bf = 190.6
$F_{14}$ = −0.756 f

TABLE 3

(Third Embodiment)
Focal length f = 100  F-number 2.8
Angle of view $2\omega$ = 96°

| No. | Radius of curvature r | Center thickness & spacing d | Refractive index n | Abbe number $\nu$ | |
|---|---|---|---|---|---|
| 1 | 158.340 | 22.060 | 1.58913 | 61.2 | $L_1$ |
| 2 | 409.746 | 0.490 | | | |
| 3 | 127.456 | 4.412 | 1.80518 | 25.4 | $L_2$ |
| 4 | 52.943 | 16.667 | | | |
| 5 | 98.876 | 4.412 | 1.71300 | 54.0 | $L_3$ |
| 6 | 49.861 | 17.158 | | | |
| 7 | 441.194 | 15.197 | 1.74000 | 28.3 | |
| 8 | −105.396 | 6.373 | 1.74810 | 52.3 | $L_4$ |
| 9 | 52.453 | 25.001 | 1.62004 | 36.3 | |
| 10 | −980.431 | 0.980 | | | |
| 11 | 149.516 | 17.648 | 1.62004 | 36.3 | $L_5$ |
| 12 | −490.215 | 6.373 | | | |
| 13 | −378.198 | 17.648 | 1.61720 | 54.0 | $L_6$ |
| 14 | −79.366 | 17.648 | | | |
| 15 | −110.298 | 17.158 | 1.78797 | 47.5 | |
| 16 | −78.434 | 5.392 | 1.78470 | 26.1 | $L_7$ |
| 17 | 229.911 | 4.902 | | | |
| 18 | −441.194 | 13.236 | 1.56384 | 60.8 | $L_8$ |
| 19 | −80.886 | 0.490 | | | |
| 20 | 416.683 | 13.726 | 1.59319 | 67.9 | $L_9$ |
| 21 | −149.978 | | | | |

Bf = 188.8
$F_{14}$ = −0.751 f

TABLE 4

(Fourth Embodiment)
Focal length f = 100  F-number 2.8
Angle of view $2\omega$ = 95°

| No. | Radius of curvature r | Center thickness & spacing d | Refractive index n | Abbe number $\nu$ | |
|---|---|---|---|---|---|
| 1 | 196.079 | 24.510 | 1.62280 | 57.0 | $L_1$ |
| 2 | 509.128 | 0.490 | | | |
| 3 | 135.784 | 5.882 | 1.78472 | 25.8 | $L_2$ |
| 4 | 54.412 | 18.137 | | | |
| 5 | 94.921 | 5.882 | 1.71300 | 54.0 | $L_3$ |
| 6 | 50.735 | 18.137 | | | |
| 7 | 357.843 | 15.686 | 1.7400 | 28.3 | |
| 8 | −117.647 | 6.863 | 1.76684 | 46.8 | $L_4$ |
| 9 | 54.902 | 24.510 | 1.64831 | 33.8 | |
| 10 | 4411.767 | 0.490 | | | |
| 11 | 160.784 | 16.176 | 1.68893 | 31.1 | $L_5$ |
| 12 | −441.177 | 7.353 | | | |
| 13 | −418.058 | 16.176 | 1.62041 | 60.3 | $L_6$ |
| 14 | −82.787 | 13.235 | | | |
| 15 | −111.765 | 23.039 | 1.77279 | 49.4 | |
| 16 | −79.902 | 6.863 | 1.78472 | 25.8 | $L_7$ |
| 17 | 256.373 | 3.922 | | | |
| 18 | −367.647 | 10.784 | 1.62041 | 60.4 | $L_8$ |
| 19 | −84.101 | 0.490 | | | |
| 20 | 563.726 | 13.725 | 1.62041 | 60.4 | $L_9$ |
| 21 | −149.932 | | | | |

Bf = 185.5
$F_{14}$ = −0.744 f

Figure 2:
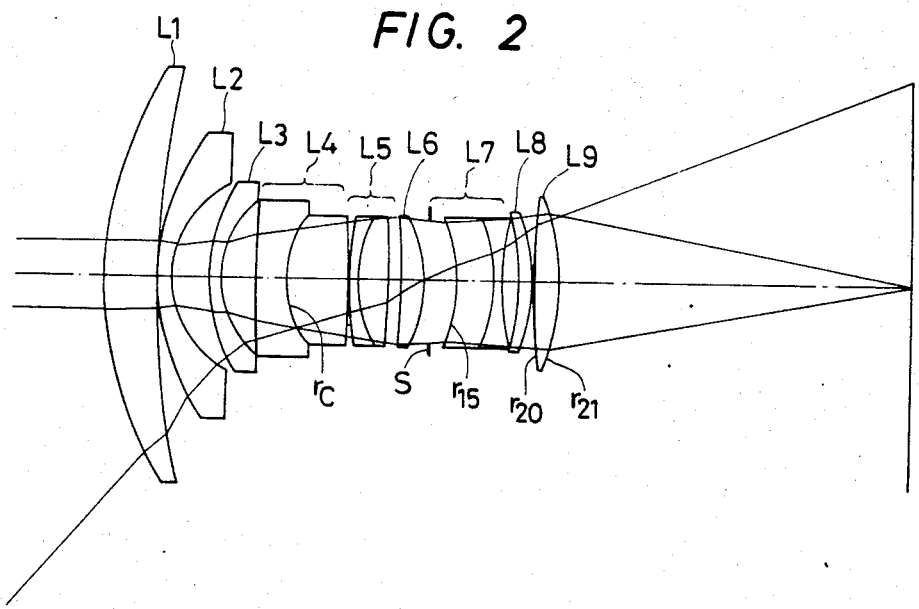
FIG. 2 shows the lens construction of fifth embodiment of the present invention.

In a fifth embodiment of the present invention, as shown in FIG. 2, the fourth component $L_4$ is comprised of a negative meniscus lens having its convex surface facing the object side and a positive lens cemented thereto, the fifth component $L_5$ is comprised of a negative meniscus lens having its convex surface facing the object side and a positive lens cemented thereto, and the seventh component $L_7$ is constructed as a cemented lens similar to that in the first embodiment.

Figure 3:
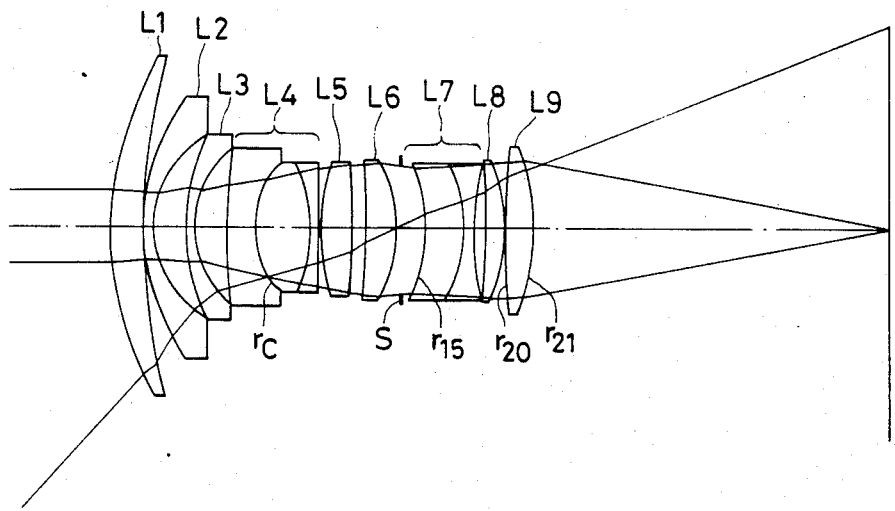
FIG. 3 shows the lens construction of a sixth embodiment of the present invention.

In a sixth embodiment of the present invention, as shown in FIG. 3, the fourth component $L_4$ is comprised of a negative meniscus lens having its convex surface facing the object side, a biconvex lens and a negative meniscus lens having its convex surface facing the image side, these three lenses being cemented together, and the construction of the seventh component L7 is similar to the construction of the seventh component in the first embodiment.

Tables 5 and 6 below show the numerical data of the fifth and sixth embodiments, respectively.

TABLE 5

(Fifth Embodiment)
Focal length f = 100  F-number 2.8
Angle view 2ω = 95°

| No. | Radius of curvature r | Center thickness & spacing d | Refractive index n | Abbe number ν | |
|---|---|---|---|---|---|
| 1 | 193.628 | 27.451 | 1.59319 | 67.9 | $L_1$ |
| 2 | 495.588 | 0.490 | | | |
| 3 | 134.804 | 6.373 | 1.74950 | 35.2 | $L_2$ |
| 4 | 53.431 | 19.608 | | | |
| 5 | 94.608 | 6.373 | 1.71700 | 48.1 | $L_3$ |
| 6 | 50.490 | 18.627 | | | |
| 7 | 377.451 | 17.157 | 1.74443 | 49.5 | |
| 8 | 53.922 | 32.353 | 1.62606 | 39.2 | $L_4$ |
| 9 | ∞ | 0.490 | | | |
| 10 | 168.137 | 4.902 | 1.69350 | 53.8 | |
| 11 | 72.549 | 17.157 | 1.68893 | 31.1 | $L_5$ |
| 12 | −514.706 | 5.882 | | | |
| 13 | −500.351 | 11.765 | 1.56384 | 60.8 | $L_6$ |
| 14 | −76.961 | 17.157 | | | |
| 15 | −100.000 | 20.098 | 1.74810 | 52.3 | |
| 16 | −75.000 | 5.392 | 1.78472 | 25.8 | $L_7$ |
| 17 | 248.530 | 3.922 | | | |
| 18 | −392.157 | 11.275 | 1.67025 | 57.6 | $L_8$ |
| 19 | −90.686 | 0.490 | | | |
| 20 | 357.843 | 13.235 | 1.56384 | 60.8 | $L_9$ |
| 21 | −132.401 | | | | |

Bf = 186.0
$F_{14}$ = −0.773 f

TABLE 6

(Sixth Embodiment)
Focal length f = 100  F-number 2.8
Angle of view 2ω = 95°

| No. | Radius of curvature r | Center thickness & spacing d | Refractive index n | Abbe number ν | |
|---|---|---|---|---|---|
| 1 | 159.297 | 18.628 | 1.61720 | 54.0 | $L_1$ |
| 2 | 403.963 | 0.490 | | | |
| 3 | 128.712 | 4.412 | 1.78470 | 26.1 | $L_2$ |
| 4 | 52.053 | 16.667 | | | |
| 5 | 98.213 | 4.412 | 1.69680 | 55.6 | $L_3$ |
| 6 | 50.694 | 17.158 | | | |
| 7 | 539.236 | 14.706 | 1.77279 | 49.4 | |
| 8 | 50.492 | 28.923 | 1.62588 | 35.6 | $L_4$ |
| 9 | −78.434 | 4.902 | 1.59319 | 67.9 | |
| 10 | −612.769 | 0.980 | | | |
| 11 | 156.869 | 16.177 | 1.64831 | 33.8 | $L_5$ |
| 12 | −689.600 | 7.353 | | | |
| 13 | −489.629 | 16.177 | 1.61266 | 44.4 | $L_6$ |
| 14 | −79.234 | 15.197 | | | |
| 15 | −102.945 | 22.060 | 1.77279 | 49.4 | |
| 16 | −69.611 | 5.392 | 1.78472 | 25.8 | $L_7$ |
| 17 | 230.401 | 4.412 | | | |
| 18 | −445.107 | 10.295 | 1.60311 | 60.7 | $L_8$ |
| 19 | −82.241 | 0.490 | | | |
| 20 | 784.344 | 13.726 | 1.59319 | 67.9 | $L_9$ |
| 21 | −134.003 | | | | |

Bf = 188.5
$f_{14}$ = −0.800 f

It is apparent that any of these embodiments, in spite of having a wide angle of view of 94° to 96° and a long back focal length, has various aberrations corrected well and has a very excellent imaging performance. In each of the above-described embodiments, the deterioration of aberrations such as astigmatism and curvature of image field occurring when the lens is focused to a short distance object can be well corrected by moving the entire lens system forwardly and at the same time, moving the first to fifth components as a unit so as to reduce the spacing d12 with respect to the succeeding lens component, as disclosed in Japanese Patent Publication No. 39875/1970.

I claim:

1. A retrofocus type wide angle lens having, in succession from the object side, a first component which is a positive meniscus lens having its convex surface facing the object side, a second component which is a negative meniscus lens having its convex surface facing the object side, a third component which is a negative meniscus lens having its convex surface facing the object side, a fourth component having a cemented surface of negative refractive power convex toward the object surface and having a negative refractive power as a whole, a fifth component which is a biconvex positive lens having a surface of sharper curvature on the object side, a sixth component which is a positive meniscus lens having its convex surface facing the image side, a stop, a seventh component which is a biconcave cemented negative lens comprising a positive meniscus lens having its convex surface facing the image side and a biconcave negative lens cemented thereto, an eighth component which is a positive meniscus lens having its convex surface facing the image side, and a ninth component which is a biconvex positive lens, said retrofocus type wide angle lens satisfying the following conditions:

$-0.9f < f_{14} < -0.6f$
$0.35f < D_4 < 0.53f$
$-1.3f < r15 < -0.9f$
$-0.9 < (r_{21}+r_{20})/(r_{21}-r_{20}) < -0.2$
$23 < \nu_2 < 40$ where f is the combined focal length of the entire system, $f_{14}$ is the combined focal length of said first to fourth components, $D_4$ is the combined center thickness of said fourth component, r15 is the radius of curvature of the object side lens surface of said seventh component, r20 and r21 are the radii of curvature of the object side and image side lens surfaces, respectively, of said ninth component, and $\nu_2$ is the Abbe number of said second component.

2. A lens according to claim 1, further satisfying the following condition:

$0.1f < (n_H - n_L)/r_c < 0.4f$, where $r_c$ is the radius of curvature of the cemented surface of said fourth component convex toward the object side and having a negative refractive power, and $n_H$ and $n_L$ are the refractive indices of the lenses on the object side and the image side, respectively, of said cemented surface.

3. A lens according to claim 1, further satisfying the following condition:

$0.2f < d15 + d16 < 0.4f$, where d15 and d16 are the center thicknesses of the positive meniscus lens and the biconcave negative lens which together constitute said seventh component.

4. A lens according to claim 1, wherein the cemented surface of the positive meniscus lens and the biconcave negative lens in said seventh component is convex toward the image side, and the following condition is satisfied:

$-1.0f < r16 < -0.5f$, where r16 is the radius of curvature of the cemented surface of said seventh component.

5. A lens according to claim 1, wherein said fourth component is comprised, in succession from the object side, of a negative meniscus lens having its convex surface facing the object side and a positive lens cemented thereto, said fifth component is comprised, in succession from the object side, of a negative meniscus lens having its convex surface facing the object side and a positive lens cemented thereto, and said seventh component is comprised, in succession from the object side, of a positive meniscus lens and a biconcave negative lens cemented together.

6. A lens according to claim 5, wherein the numerical data are as follows:

TABLE 5

(Fifth Embodiment)
Focal length f = 100  F-number 2.8
Angle of view 2ω = 95°

| No. | Radius of curvature r | Center thickness & spacing d | Refractive index n | Abbe number ν | |
|---|---|---|---|---|---|
| 1 | 193.628 | 27.451 | 1.59319 | 67.9 | L₁ |
| 2 | 495.588 | 0.490 | | | |
| 3 | 134.804 | 6.373 | 1.74950 | 35.2 | L₂ |
| 4 | 53.431 | 19.608 | | | |
| 5 | 94.608 | 6.373 | 1.71700 | 48.1 | L₃ |
| 6 | 50.490 | 18.627 | | | |
| 7 | 377.451 | 17.157 | 1.74443 | 49.5 | |
| 8 | 53.922 | 32.353 | 1.62606 | 39.2 | L₄ |
| 9 | ∞ | 0.490 | | | |
| 10 | 168.137 | 4.902 | 1.69350 | 53.8 | |
| 11 | 72.549 | 17.157 | 1.68893 | 31.1 | L₅ |
| 12 | −514.706 | 5.882 | | | |
| 13 | −500.351 | 11.765 | 1.56384 | 60.8 | L₆ |
| 14 | −76.961 | 17.157 | | | |
| 15 | −100.000 | 20.098 | 1.74810 | 52.3 | |
| 16 | −75.000 | 5.392 | 1.78472 | 25.8 | L₇ |
| 17 | 248.530 | 3.922 | | | |
| 18 | −392.157 | 11.275 | 1.67025 | 57.6 | L₈ |
| 19 | −90.686 | 0.490 | | | |
| 20 | 357.843 | 13.235 | 1.56384 | 60.8 | L₉ |
| 21 | −132.401 | | | | |

$F_{14} = -0.773\ f$

7. A lens according to claim 1, wherein said fourth component is comprised, in succession from the object side, of a negative meniscus lens having its convex surface facing the object side, a biconvex positive lens and a negative meniscus lens having its convex surface facing the image side, said three lenses being cemented together, and said seventh component is comprised, in succession from the object side, of a positive meniscus lens and a biconcave negative lens cemented together.

8. A lens according to claim 7, wherein the numerical data are as follows:

TABLE 6

(Sixth Embodiment)
Focal length f = 100  F-number 2.8
Angle of view 2ω = 95°

| No. | Radius of curvature r | Center thickness & spacing d | Refractive index n | Abbe number ν | |
|---|---|---|---|---|---|
| 1 | 159.297 | 18.628 | 1.61720 | 54.0 | L₁ |
| 2 | 403.963 | 0.490 | | | |
| 3 | 128.712 | 4.412 | 1.78470 | 26.1 | L₂ |
| 4 | 52.053 | 16.667 | | | |
| 5 | 98.213 | 4.412 | 1.69680 | 55.6 | L₃ |
| 6 | 50.694 | 17.158 | | | |
| 7 | 539.236 | 14.706 | 1.77279 | 49.4 | |
| 8 | 50.492 | 28.923 | 1.62588 | 35.6 | L₄ |
| 9 | −78.434 | 4.902 | 1.59319 | 67.9 | |
| 10 | −612.769 | 0.980 | | | |
| 11 | 156.869 | 16.177 | 1.64831 | 33.8 | L₅ |
| 12 | −689.600 | 7.353 | | | |
| 13 | −489.629 | 16.177 | 1.61266 | 44.4 | L₆ |
| 14 | −79.234 | 15.197 | | | |
| 15 | −102.945 | 22.060 | 1.77279 | 49.4 | |
| 16 | −69.611 | 5.392 | 1.78472 | 25.8 | L₇ |
| 17 | 230.401 | 4.412 | | | |

TABLE 6-continued (Sixth Embodiment)
Focal length f = 100  F-number 2.8
Angle of view 2ω = 95°

| No. | Radius of curvature r | Center thickness & spacing d | Refractive index n | Abbe number ν | |
|---|---|---|---|---|---|
| 18 | −455.107 | 10.295 | 1.60311 | 60.7 | L₈ |
| 19 | −82.241 | 0.490 | | | |
| 20 | 784.344 | 13.726 | 1.59319 | 67.9 | L₉ |
| 21 | −134.003 | | | | |

$f_{14} = -0.800\ f$

9. A lens according to claim 1, wherein said fourth component is comprised, in succession from the object side, of a biconvex positive lens, a biconcave negative lens and a positive lens cemented together, and said seventh component is comprised, in succesion from the object side, of a positive meniscus lens and a biconcave negative lens cemented together.

10. A lens according to claim 9, wherein the numerical data are as follows:

TABLE 1

(First Embodiment)
Focal length f = 100  F-number 2.8
Angle of view 2ω = 94°

| No. | Radius of curvature r | Center thickness & spacing d | Refractive index n | Abbe number ν | |
|---|---|---|---|---|---|
| 1 | 194.441 | 27.481 | 1.62041 | 60.4 | L₁ |
| 2 | 496.499 | 0.491 | | | |
| 3 | 135.475 | 6.870 | 1.78470 | 26.1 | L₂ |
| 4 | 54.154 | 19.629 | | | |
| 5 | 95.250 | 5.889 | 1.71300 | 54.0 | L₃ |
| 6 | 50.692 | 18.648 | | | |
| 7 | 375.014 | 15.703 | 1.75520 | 27.6 | |
| 8 | −147.513 | 6.379 | 1.77279 | 49.4 | L₄ |
| 9 | 58.690 | 24.536 | 1.62588 | 35.6 | |
| 10 | ∞ | 0.491 | | | |
| 11 | 161.670 | 16.194 | 1.67270 | 32.2 | L₅ |
| 12 | −462.413 | 7.852 | | | |
| 13 | −441.788 | 15.703 | 1.58267 | 46.5 | L₆ |
| 14 | −80.115 | 16.194 | | | |
| 15 | −112.362 | 22.083 | 1.77279 | 49.4 | |
| 16 | −69.443 | 5.398 | 1.78470 | 26.1 | L₇ |
| 17 | 264.223 | 4.034 | | | |
| 18 | −389.780 | 10.796 | 1.62041 | 60.4 | L₈ |
| 19 | −85.215 | 0.491 | | | |
| 20 | 472.174 | 13.740 | 1.62041 | 60.4 | L₉ |
| 21 | −153.303 | | | | |

$f_{14} = -0.737\ f$

11. A lens according to claim 9, wherein the numerical data are as follows:

TABLE 2

(Second Embodiment)
Focal Length f = 100  F-number 2.8
Angle of view 2ω = 96°

| No. | Radius of curvature r | Center thickness & spacing d | Refractive index n | Abbe number ν | |
|---|---|---|---|---|---|
| 1 | 161.771 | 20.589 | 1.59319 | 67.9 | L₁ |
| 2 | 435.296 | 0.490 | | | |
| 3 | 131.378 | 4.412 | 1.79504 | 28.6 | L₂ |
| 4 | 51.473 | 16.667 | | | |
| 5 | 96.904 | 4.412 | 1.71700 | 48.1 | L₃ |
| 6 | 51.255 | 17.158 | | | |
| 7 | 490.216 | 14.216 | 1.74077 | 27.6 | |
| 8 | −117.652 | 7.353 | 1.74810 | 52.3 | L₄ |
| 9 | 52.943 | 25.001 | 1.61293 | 37.0 | |
| 10 | −637.281 | 0.980 | | | |
| 11 | 150.986 | 17.648 | 1.64831 | 33.8 | L₅ |
| 12 | −833.367 | 6.618 | | | |
| 13 | −562.581 | 17.648 | 1.62041 | 60.3 | L₆ |

TABLE 2-continued (Second Embodiment)
Focal Length f = 100   F-number 2.8
Angle of view 2ω = 96°

| No. | Radius of curvature r | Center thickness & spacing d | Refractive index n | Abbe number ν | |
|---|---|---|---|---|---|
| 14 | −80.395 | 14.706 | | | |
| 15 | −109.318 | 20.589 | 1.79668 | 45.5 | |
| 16 | −83.337 | 5.392 | 1.78472 | 25.8 | $L_7$ |
| 17 | 229.911 | 4.902 | | | |
| 18 | −455.901 | 11.275 | 1.60311 | 60.7 | $L_8$ |
| 19 | −82.580 | 0.490 | | | |
| 20 | 647.085 | 13.726 | 1.62041 | 60.4 | $L_9$ |
| 21 | −156.504 | | | | |

$F_{14} = -0.756\ f$

12. A lens according to claim 9, wherein the numerical data are as follows:

TABLE 3

(Third Embodiment)
Focal length f = 100   F-number 2.8
Angle of view 2ω = 96°

| No. | Radius of curvature r | Center thickness & spacing d | Refractive index n | Abbe number ν | |
|---|---|---|---|---|---|
| 1 | 158.340 | 22.060 | 1.58913 | 61.2 | $L_1$ |
| 2 | 409.746 | 0.490 | | | |
| 3 | 127.456 | 4.412 | 1.80518 | 25.4 | $L_2$ |
| 4 | 52.943 | 16.667 | | | |
| 5 | 98.876 | 4.412 | 1.71300 | 54.0 | $L_3$ |
| 6 | 49.861 | 17.158 | | | |
| 7 | 441.194 | 15.197 | 1.74000 | 28.3 | |
| 8 | −105.396 | 6.373 | 1.74810 | 52.3 | $L_4$ |
| 9 | 52.453 | 25.001 | 1.62004 | 36.3 | |
| 10 | −980.431 | 0.980 | | | |
| 11 | 149.516 | 17.648 | 1.62004 | 36.3 | $L_5$ |
| 12 | −490.215 | 6.373 | | | |
| 13 | −378.198 | 17.648 | 1.61720 | 54.0 | $L_6$ |
| 14 | −79.366 | 17.648 | | | |

TABLE 3-continued (Third Embodiment)
Focal length f = 100   F-number 2.8
Angle of view 2ω = 96°

| No. | Radius of curvature r | Center thickness & spacing d | Refractive index n | Abbe number ν | |
|---|---|---|---|---|---|
| 15 | −110.298 | 17.158 | 1.78797 | 47.5 | |
| 16 | −78.434 | 5.392 | 1.78470 | 26.1 | $L_7$ |
| 17 | 229.911 | 4.902 | | | |
| 18 | −441.194 | 13.236 | 1.56384 | 60.8 | $L_8$ |
| 19 | −80.886 | 0.490 | | | |
| 20 | 416.683 | 13.726 | 1.59319 | 67.9 | $L_9$ |
| 21 | −149.978 | | | | |

$F_{14} = -0.751\ f$

13. A lens according to claim 9, wherein the numerical data are as follows:

TABLE 4

(Fourth Embodiment)
Focal length f = 100   F-number 2.8
Angle of view 2ω = 95°

| No. | Radius of curvature r | Center thickness & spacing d | Refractive index n | Abbe number ν | |
|---|---|---|---|---|---|
| 1 | 196.079 | 24.510 | 1.62280 | 57.0 | $L_1$ |
| 2 | 509.128 | 0.490 | | | |
| 3 | 135.784 | 5.882 | 1.78472 | 25.8 | $L_2$ |
| 4 | 54.412 | 18.137 | | | |
| 5 | 94.921 | 5.882 | 1.71300 | 54.0 | $L_3$ |
| 6 | 50.735 | 18.137 | | | |
| 7 | 357.843 | 15.686 | 1.7400 | 28.3 | |
| 8 | −117.647 | 6.863 | 1.76684 | 46.8 | $L_4$ |
| 9 | 54.902 | 24.510 | 1.64831 | 33.8 | |
| 10 | 4411.767 | 0.490 | | | |
| 11 | 160.784 | 16.176 | 1.68893 | 31.1 | $L_5$ |
| 12 | −441.177 | 7.353 | | | |
| 13 | −418.058 | 16.176 | 1.62041 | 60.3 | $L_6$ |
| 14 | −82.787 | 13.235 | | | |
| 15 | −111.765 | 23.039 | 1.77279 | 49.4 | |
| 16 | −79.902 | 6.863 | 1.78472 | 25.8 | $L_7$ |
| 17 | 256.373 | 3.922 | | | |
| 18 | −367.647 | 10.784 | 1.62041 | 60.4 | $L_8$ |
| 19 | −84.101 | 0.490 | | | |
| 20 | 563.726 | 13.725 | 1.62041 | 60.4 | $L_9$ |
| 21 | −149.932 | | | | |

$F_{14} = -0.744\ f$

* * * * *